Jan. 30, 1940.　　　　　E. F. SEAMAN　　　　　2,188,317
NONCARBONIZING ARC RESISTANT MATERIAL
Filed Jan. 4, 1938
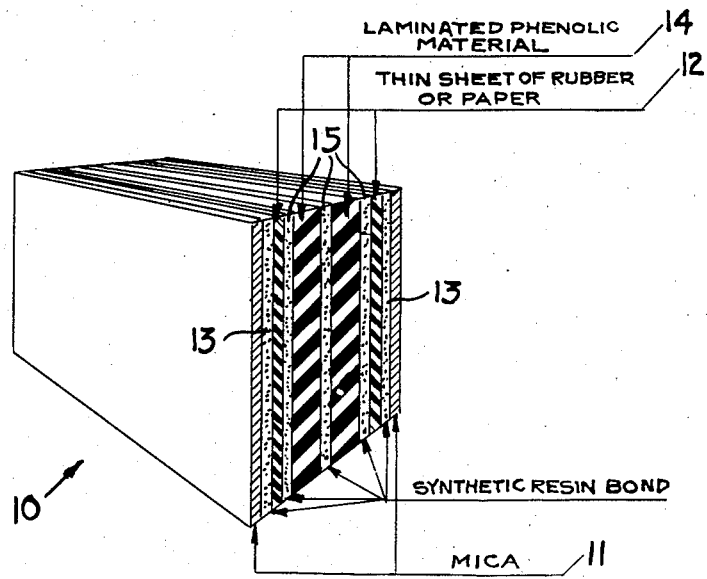
ELLSWORTH F. SEAMAN
INVENTOR
BY
ATTORNEY Patented Jan. 30, 1940

2,188,317

UNITED STATES PATENT OFFICE 2,188,317

NONCARBONIZING ARC RESISTANT MATERIAL

Ellsworth F. Seaman, Washington, D. C.

Application January 4, 1938, Serial No. 183,283

2 Claims. (Cl. 154—2.6)

(Granted under the act of March 3, 1883, as amended April 30, 1928; 370 O. G. 757)

This invention relates to a noncarbonizing arc resistant material, and has for an object to provide a light weight noncarbonizing arc resistant material, especially useful as an arc barrier in such equipment as switches, contactors, circuit breakers, etc.

A further object of this invention is to make a noncarbonizing arc resistant material which is unaffected by heat, oil or moisture, has sufficient mechanical strength for the purpose intended and is lighter in weight than asbestos board, porcelain, or other ceramic material normally employed for the same purpose.

A further object of this invention is to provide a noncarbonizing arc resistant material which is at least slightly flexible, thereby providing shock and vibration resistant qualities where such are necessary.

With the above and other objects in view, the invention consists in the construction, combination and arrangement of parts as will be hereinafter more fully described.

The figure is a perspective view of the noncarbonizing arc resistant material of this invention.

There is shown at 10 the noncarbonizing arc resistant material of this invention which is made of a series of laminations. The outer laminations of this material 10 are of a material which is a good arc resistant, such as sheet mica. Sheet mica itself however, is very fragile. To overcome this defect and to provide the necessary qualities the sheets of mica 11 are cemented or bonded firmly to a sheet or sheets of other materials used for reinforcing purposes. The other materials may be thin sheets of rubber or paper 12, which is cemented to the mica 11, by synthetic resin bonds 13. Between the thin sheets of rubber or paper 12 there are provided sheets of laminated phenolic material 14, including, for instance, Bakelite. These sheets of laminated phenolic material 14 are bonded to each other and to the thin sheets of rubber or paper 12 by additional synthetic resin bonds 15. Although two sheets of laminated synthetic material are shown, it is obvious that but a single sheet may be utilized or, if necessary, additional sheets may be similarly incorporated.

The whole material becomes an infusible mass after the application of heat and pressure and as a result of the addition of polymerizing agents, while the synthetic resin bonds may be of the phenol formaldehyde type. Further, the sheets of rubber or paper 12 may be included or omitted as necessary, depending on whether or not the lamination cement or binding materials are such that the coefficient of expansion of the different materials will adversely affect the adhesion of the laminations.

In operation the material thus provided may be used wherever it is necessary to provide a noncarbonizing arc resistant surface. Mica, the surface of this material, is a very good arc resistant material and does not carbonize, while the necessary mechanical strength and flexibility is provided by means of the laminations provided between the outer mica surfaces.

It will be understood that the above description and accompanying drawing comprehends only the general and preferred embodiment of my invention, and that various changes in construction, proportion and arrangement of parts may be made within the scope of the appended claims without sacrificing any of the advantages of my invention.

The invention described herein may be manufactured and/or used by or for the Government of the United States of America for governmental purposes without the payment of any royalties thereon or therefor.

What I claim as new is:

1. As a new article of manufacture, a noncarbonizing arc resistant sheet material comprising a body composed of laminated material, said body comprising two outermost laminations of mica, an innermost synthetic resin bond, two sheets of laminated phenolic material united by said synthetic resin bond, a synthetic resin bond on the outer face of each sheet of laminated phenolic material, a thin sheet of rubber on the outer face of each of said last mentioned synthetic resin bonds, and a synthetic resin bond on the outer face of each thin sheet of rubber uniting said thin sheet of rubber and said inner laminations to the inner faces of the mica laminations.

2. As a new article of manufacture, a noncarbonizing arc resistant sheet material comprising a body composed of laminated material, said body comprising two outermost laminations of mica, an innermost synthetic resin bond, two sheets of laminated phenolic material united by said synthetic resin bond, a synthetic resin bond on the outer face of each sheet of laminated phenolic material, a sheet of paper on the outer face of each of said last mentioned synthetic resin bonds, and a synthetic resin bond on the outer face of each sheet of paper uniting said sheet of paper and said inner laminations to the inner faces of the mica laminations.

ELLSWORTH F. SEAMAN.